Figure 1:
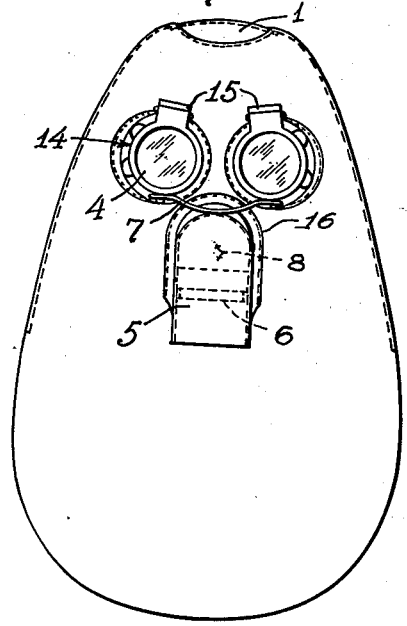

July 15, 1941.　　　G. W. GOLDSMITH　　　2,249,239
WELDING HOOD
Filed Nov. 22, 1938

INVENTOR.
George W. Goldsmith
BY Claude E. Swift
ATTORNEY.

Patented July 15, 1941

2,249,239

UNITED STATES PATENT OFFICE 2,249,239

WELDING HOOD

George Walter Goldsmith, Compton, Calif.

Application November 22, 1938, Serial No. 241,755

3 Claims. (Cl. 2—8)

This invention relates to a head covering, hood or helmet to be used as a protector for the head and more specifically the face and eyes.

It is customary for metal welders to employ protectors of various sorts for the face and eyes to eliminate danger of injury during welding. The extreme brilliancy of the light which is produced by burning acetylene with oxygen in a welder's torch is very injurious to the unprotected eye of the operator. Likewise the light produced by the arc during electric welding is very intense and causes injury to the unprotected eye.

In order to cut down the intensity of the light while welding by either one of the aforementioned methods it has been customary for the welder to employ goggles fitted with dark glass lenses to materially reduce the intensity of the light in order to prevent injury to the eye. Goggles however, are unsuitable since they do not afford protection to the face from molten metal sparks generated from the metal by the torch or electric arc. Furthermore, an appreciable amount of the welder's work is carried out in confined quarters when the welder's face is close to the object being welded; therefore, unless the face is protected injury may result from the heat produced by the torch or the arc. Ofttimes, the welder is forced to lie on his back and weld objects upward from the face. In this position the face of the welder is sure to receive injury from molten metal sparks or bits unless some sort of protection is afforded for the face.

Several types of hoods have been employed by the welder to protect the face and eyes; however, each possesses objectionable features. One type of hood or helmet which is widely used is made from a heat resistant asbestos composition molded in the form of an oval to fit the face. This oval is held in place by a top support and a strap which fastens at the rear of the head. The front of the oval is provided with an opening for the eyes into which there is fitted a dark glass lens to cut down or reduce the intensity or brilliancy of the welding flame or arc. This hood possesses a number of features which renders its protective qualities ineffective. Furthermore, for certain types of work this helmet is highly unsatisfactory. If the welder is working on a job where a reflective surface, such as an ordinary wall, is directly behind him, the light of the torch or arc striking this reflecting surface is conveyed into the rear of the hood and thereby cuts down the welder's vision through the darkened lens of the helmet. This "back light" as it is termed by the welder is very troublesome since it obscures the object being welded. In other words, the eye of the welder is constantly being subjected to stray light transmitted into the hood or helmet from the torch or arc by reflection of the light from surfaces behind him. This constant changing light intensity within the helmet obviously cuts down the welder's vision.

Furthermore, the ordinary type of welding helmet, as described above, does not have any means of properly eliminating the breath of the welder, consequently the moisture in the used air which is exhaled by the welder contacts the lens on the inside of the helmet and in cold weather the condensation of the moisture, in this exhaled air on the inner surface of the helmet lens, lowers the vision of the welder for his work.

Furthermore, the ordinary type of welding helmet will remain in its normal position on the head providing the welder is in normal standing position. However, if the welder leans forward, lays on his back or tilts his body sidewise, while welding, he is forced to hold the helmet in normal position with one hand and only has a single hand with which to carry out the welding operation.

The present invention is for a hood or helmet which will remain in its normal position, regardless of the position of the welder's body, will eliminate all back or stray light from inside the helmet, will not have its lens clouded or fogged by the breath of the welder and will afford the welder of a source of fresh air throughout the welding operation.

The object of the present invention is therefore a welding helmet, which will remain in its normal head position regardless of the position of the welder, will eliminate all reflected or stray light from gaining entry through the rear of the helmet, will not have its lens filmed over or clouded with condensate from the breath and possesses means for supplying fresh air to the welder; such means also affording a proper outlet for the air exhaled by the welder.

Figure 1 shows a front view of the helmet.

Figure 2:
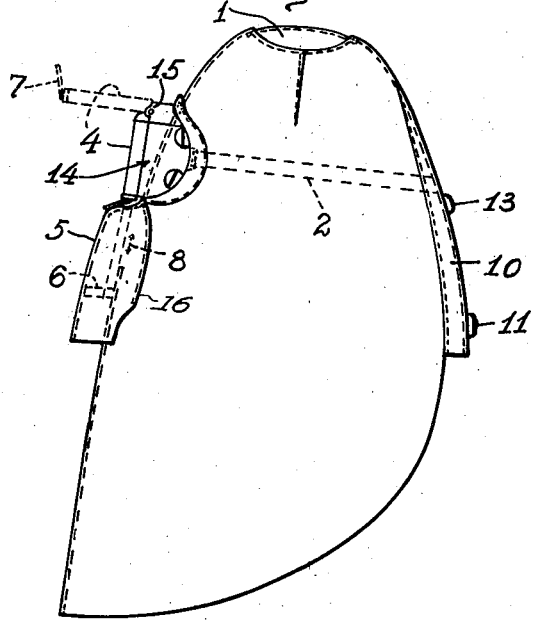

Figure 2 is a side view of the helmet showing the lenses of the helmet raised to a horizontal position to permit unobstructed vision when the helmet is not in use to protect the eyes from glare. This view shows the rear of the hood buttoned by means of snaps or buttons 11 and 13. Furthermore, this view shows a side view of the air-port 5, with its stiffener 6.

Figure 3:
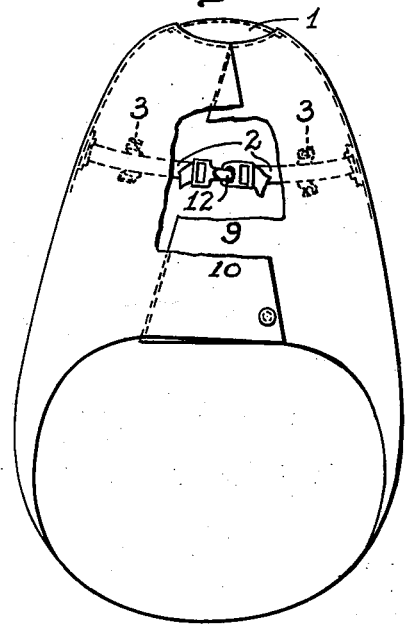

Figure 3 is a rear view of the helmet showing flaps 9 and 10 buttoned down on the back of the head by fasteners 11 and 13. This view also shows clip 12 as a means for fastening the two supporting bands 2 of the goggle portion of the hood. This fastener is of the adjustable type to permit the lengths of the bands 2 to be varied in order that a tight fit may be obtained and thereby obviate shifting of the hood since the goggle straps 2 hold the hood securely in place in passing through fasteners 3 which are securely stitched to the hood at appropriate spaced intervals at the sides and rear of the hood.

Figure 4:
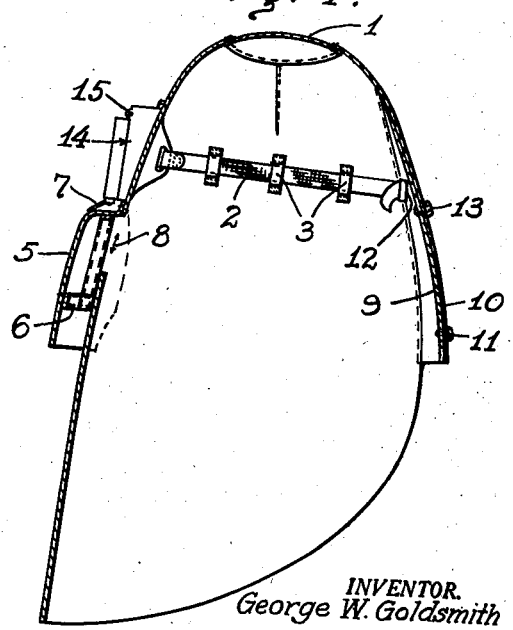

Figure 4 is a modification of Figure 2, showing the lenses 4 in a vertical position for use in protection of the eyes from glare. This view also shows the air-port in detail. The opening 8 for the nose is completely covered by 5 in order to eliminate entry of light and heat into the helmet. The stiffening member 6, is also shown, which permits the air-port covering 5 from collapsing.

Referring in detail to Figure 1, the body of the helmet is made from pliable fabric or leather. The crown 1 fits snugly to the top of the head and may, if desired, contain padding for the purpose of lending comfort to the wearer. The goggles 14 are fitted securely into openings in the face of the helmet by means of the leather or fabric strips which are sewed around the goggle base fittings. Each of the lenses are hinged to the goggle base fittings by means of hinges 15. By means of these hinges the lenses of the goggles may be lifted to a horizontal position by means of lever 7, as shown in Figure 2. Directly beneath the goggles there is an opening 8 in the hood to permit free entry of air to the nasal passage. The opening 8 is covered by the tube or shaft 5, which permits free passage of air into the opening 8, but which prevents any light from entering the hood. The tube or shaft 5 is provided with a stiffener member 6 in order to prevent it from collapsing and thereby obstructing free passage of air.

The seam 16, on the air passage 5, fits snugly to the face thereby preventing air exhaled, by the person wearing the helmet, from coming in contact with the inner surface of the lenses 4 and thereby causing the glasses to become fogged or blurred by the condensate in the breath.

In Figures 2, 3 and 4 the method of securing the hood to the head is shown. This is accomplished by the goggle bands 2, which are fastened at the rear of the head by fastener 12, and which pass through the clips 3 sewed to the hood at spaced intervals, along the sides and rear of the hood. By adjusting the hood in proper position and then tightening the goggle bands 2, by means of clip 12, it is possible to secure the hood to the head so that it will not shift from its normal position if the wearer shifts from a normal standing position to any other position. In other words, the wearer may lie flat on his back or on his side or stomach, or in any other position without causing the hood to be shifted from its normal position or without the necessity of holding it in place while in these abnormal positions as is the case with the helmets now used. Furthermore, by securing the hood in position by means of the goggle straps 12, the front position of the hood in the vicinity of seam 16 is brought into contact with the face thereby preventing any passage of air from the nose or mouth to the upper portion of the hood and thereby causing the lenses to become fogged due to condensed moisture, as explained above.

The flaps 9 and 10 are securely fastened by means of fasteners 11 and 13 on the rear of the hood thereby completely closing the rear of the hood and preventing any reflected light from entering the back of the hood and hindering the vision of the person wearing the hood.

It is, therefore, an object of the present invention to provide a helmet for the head which will not shift from its normal position regardless of the body position of the person wearing the helmet, will not permit moisture from the breath to come into contact with the inner surfaces of the lenses and is closed at the rear to prevent entry of light to interfere with the vision of the wearer.

I claim:

1. A welder's helmet comprising a crown adapted to fit the top of the head, a panel attached to the front and sides of said crown, the ends of said panel extending to the rear of said helmet and overlapping to close the rear of said helmet, a light port in the front of said panel fitted with a lens, straps attached to opposite sides of said lens and passing through keepers on opposite sides of the helmet to the rear of said helmet, an adjustable fastener attached to the ends of straps at the rear of the helmet, an air port in the front of said helmet beneath said light port, said air port having a seam along its sides thereby being adapted to permit free influx and efflux of air to the nose without permitting exhaled air to contact the inner surface of said lens.

2. A helmet comprising a flexible panel covering the front and crown of the head, the sides of said panel extending to the rear of the head and overlapping to form a closure against entry of light, a lens fitted in the front of said helmet and secured to said helmet by means of straps attached to opposite sides of said lens and passing through keepers attached to the sides of said helmet, an adjustable fastener at the rear of said helmet to receive said straps, an air port in the front of said panel positioned beneath said lens, said air port being fitted snugly by means of a seam to said face to permit free passage of air to and from the nose but preventing any substantial quantity of exhaled air from coming in contact with said lens.

3. A welder's helmet comprising a flexible panel forming a covering for the top, front and sides of the head, said panel overlapping at the rear of the head, a lens fitted to the front of the helmet and provided with straps at its opposite sides which extend through keepers attached to the sides of the helmet to the rear of the helmet, a fastener at the rear of the helmet to secure the ends of the straps, an air port positioned in the front of the panel below the lens and bounded by a seam forming a tight fit above the nose, and a covering for said air port with an air opening on the lower side of said covering.

GEORGE WALTER GOLDSMITH.